(12) United States Patent
Agari et al.

(10) Patent No.: US 8,822,583 B2
(45) Date of Patent: Sep. 2, 2014

(54) TRANSPARENT HEAT RADIATING COATING COMPOSITION

(75) Inventors: Yasuyuki Agari, Osaka (JP); Akira Miyoshi, Osaka (JP); Ryohei Tsuboi, Osaka (JP)

(73) Assignees: Godo Printing Ink Mfg. Co., Ltd., Osaka (JP); Osaka Municipal Technical Research Insititute, Osaka (JP)

( * ) Notice: Subject to any disclaimer, the term of this patent is extended or adjusted under 35 U.S.C. 154(b) by 0 days.

(21) Appl. No.: 13/583,581

(22) PCT Filed: Jan. 14, 2011

(86) PCT No.: PCT/JP2011/050514
§ 371 (c)(1),
(2), (4) Date: Oct. 11, 2012

(87) PCT Pub. No.: WO2011/111414
PCT Pub. Date: Sep. 15, 2011

(65) Prior Publication Data
US 2013/0072617 A1  Mar. 21, 2013

(30) Foreign Application Priority Data
Mar. 9, 2010  (JP) ................. 2010-051933

(51) Int. Cl.
*C08K 3/26* (2006.01)
(52) U.S. Cl.
USPC ........................................... 524/424

(58) Field of Classification Search
USPC ........................................... 524/424
See application file for complete search history.

(56) References Cited

U.S. PATENT DOCUMENTS

2010/0209845 A1* 8/2010 Kubota et al. .............. 430/270.1

FOREIGN PATENT DOCUMENTS

| JP | 2002-155168 A | 5/2002 |
| JP | 2004-35673 A | 2/2004 |
| JP | 2006-124597 A | 5/2006 |
| JP | 2007-119764 A | 5/2007 |

OTHER PUBLICATIONS

International Preliminary Report on Patentability for International Patent Application No. PCT/JP2011/050514, dated Nov. 7, 2012.
International Search Report issued in PCT/JP2011/050514 dated Apr. 12, 2011.

* cited by examiner

*Primary Examiner* — Peter Szekely
(74) *Attorney, Agent, or Firm* — Birch, Stewart, Kolasch & Birch, LLP (57) ABSTRACT

The present invention provides a transparent heat radiating coating composition capable of forming a coating layer having excellent transparency and heat radiating properties. The transparent heat radiating coating composition of the present invention is a transparent heat radiating coating composition including a binder resin, a hydrotalcite-series compound and a resin dispersant with an amine value of 0 to 90 mgKOH/g, wherein the transparent heat radiating coating composition includes 50 to 290 parts by weight of the hydrotalcite-series compound based on 100 parts by weight of the binder resin.

6 Claims, 1 Drawing Sheet

US 8,822,583 B2

TRANSPARENT HEAT RADIATING COATING COMPOSITION

TECHNICAL FIELD

The present invention relates to a transparent heat radiating coating composition capable of forming, by way of coating, a transparent heat radiating coating layer having excellent heat radiating properties and transparency.

BACKGROUND ART

Associated with advancing high performance technologies in recent years, electronic element components such as integrated circuits and semiconductor elements have been applied to drive units, semiconductor units, power devices, various electronic equipments and the like used in automobile, robot and other industries. In these units and equipment, an improvement in heat radiating properties has been a major issue. In electronic element components in general, a portion of electric energy is converted into heat energy. Associated with advancement of performance in units and equipments, the amount of the converted heat energy increases, which results in heat generation. Electronic element components are susceptible to heat and may possibly be led to malfunctions and the like by the heat. Thus, it is necessary to eliminate the heat by means of heat radiation, cooling and others.

In electronic equipments and the like with casing, it is possible to effectively eliminate heat by enhancing the thermal conductivity of heat energy generated in the electronic element components to the casing and also scaling up the heat radiating properties of the casing, i.e., a tendency to lose heat by convection and/or radiation. As means to scale up the heat radiating properties of the casing, means applying convection have been primarily used where heat is removed by air sent by use of, for example, a fan. However, associated with downsizing of electronic equipments in recent years, such means are often difficult to be provided in many cases. As a result, a means, for example, has been given attention, in expectation of its radiation effect, where a coating film having excellent heat radiating properties is formed by coating a heat radiating coating material on casings. However, a conventional heat radiating coating material generally includes carbon black or graphite having high radiation rate. Such a heat radiating coating material includes black colored carbon black or graphite, and therefore it is inferior in design and may often cause a problem in designing products of electronic equipments.

Meanwhile, with a view to improving design, heat radiating coating materials colored other than black have been studied. For example, JP H10-279845A (Patent Document 1) describes a far infrared radiation coating material containing metal oxide ceramics such as $Al_2O_3$, $SiO_2$ and $TiO_2$. These metal oxide ceramics are in white, thus making the coating material more flexible in color designing as compared with those containing black ingredients and imparting an advantage in improving design. On the other hand, the far infrared radiation coating material described in Patent Document 1 is in white and is opaque. As a result, in the case where an article to be coated is a metal substrate, for example, the coating material is inadequate to be used in expressing the gloss of the metal substrate itself.

JP 2003-309383A (Patent Document 2) describes a heat radiating body having a coating film containing sodium silicate, potassium silicate and metal oxides such as silicon oxide and aluminum oxide. Because the coating film disclosed in Patent Document 2 is a mineral coating material, there is a possibility that its adhesiveness to an article to be coated may be insufficient.

JP 2006-124597A (Patent Document 3) describes a heat radiating material containing a powder of a metal compound selected from a hydrotalcite-series compound, zirconium silicate and zirconium carbide, and a resin ingredient. On the other hand, while Patent Document 3 describes obtaining a transparent coating film, the degree of transparency of the coating film is not disclosed. The degree of transparency of a coating film greatly affects the appearance of a coated article and has a direct effect on design, thus it is an important factor in designing a product.

JP 2004-043612A (Patent Document 4) describes a heat releasing coating material containing $SnO_2$—$Sb_2O_5$-based semiconductor particles in a coating material vehicle. The $SnO_2$—$Sb_2O_5$-based semiconductor particles used in the patent document are also in white, thus a coating film to be obtained is opaque and imposes a restriction on design.

PRIOR ART DOCUMENTS

Patent Documents

Patent Document 1: JP H10-279845A
Patent Document 2: JP 2003-309383A
Patent Document 3: JP 2006-124597A
Patent Document 4: JP 2004-043612A

SUMMARY OF THE INVENTION

Problems to be Solved by the Invention

Many of heat radiating coating films colored other than black developed so far are coating films obtained by coating a suspension on an article to be coated, where the suspension includes metal oxides such as $Al_2O_3$, $SiO_2$ and $TiO_2$, or sodium silicate, calcium silicate, zirconium silicate, zirconium carbide, or a hydrotalcite-series compound dispersed therein. Coating films obtained in this manner exhibit heat radiating effects to a certain extent, however, any of them is low in light transmittance and its transparency is not so high. Thus, it is an object of the present invention to provide a coating composition capable of forming a coating layer having excellent transparency and heat radiating properties.

Solutions to the Problems

The present invention provides a transparent heat radiating coating composition comprising a binder resin, a hydrotalcite-series compound and a resin dispersant with an amine value of 0 to 90 mgKOH/g, wherein the transparent heat radiating coating composition includes 50 to 290 parts by weight of the hydrotalcite-series compound based on 100 parts by weight of the binder resin, and accordingly the object of the present invention stated above is achieved.

A difference between a refractive index of the binder resin and that of the hydrotalcite-series compound is more preferably 0 to 0.2, and a transparent heat radiating coating layer formed by coating the transparent heat radiating coating composition more preferably has a haze value of 0 to 30 and a total light transmittance of 80 to 100%.

The resin dispersant is more preferably an anionic-based, cationic-based, nonionic-based or a polymer type resin dispersant.

The resin dispersant more preferably has an acid value of 0 to 150 mgKOH/g.

The binder resin is more preferably one or more resins selected from the group consisting of an acrylic resin, a polyolefin resin and a cellulose acetate resin.

The binder resin is more preferably an acrylic resin. Moreover, the binder resin is more preferably an acrylic resin having an acid value of 1 to 20 mgKOH/g.

The transparent heat radiating coating composition is more preferably a coating composition obtained by mixing a binder resin, a hydrotalcite-series compound and a resin dispersant with an amine value of 0 to 90 mgKOH/g, and then conducting high dispersion treatment.

The present invention also provides a heat radiating material having a transparent heat radiating coating layer formed by coating the transparent heat radiating coating composition, and a substrate.

The present invention also provides a method for producing a transparent heat radiating coating composition comprising a mixing step of mixing a hydrotalcite-series compound, a resin dispersant with an amine value of 0 to 90 mgKOH/g and a binder resin so that the amount of the hydrotalcite-series compound is 50 to 290 parts by weight based on 100 parts by weight of the binder resin, and a dispersion treatment step of conducting a high dispersion treatment on the resulting mixture.

ADVANTAGES OF THE INVENTION

A coating layer obtained by coating the transparent heat radiating coating composition of the present invention has a feature of excellent heat radiating properties and high transparency. The hydrotalcite-series compound contained in the transparent heat radiating coating composition of the present invention is known as a coating additive exhibiting excellent effects in anticorrosion properties and adhesive properties for metal substrates. Further, the present invention is based upon an experimental finding that a coating layer can be formed by homogeneously dispersing the hydrotalcite-series compound into the binder resin using a specified resin dispersant, where the coating layer, despite its high transparency, exhibits both excellent heat(far infrared radiation) absorption properties and excellent heat (far infrared radiation) radiating properties as a result of the binder resin and the hydrotalcite-series compound acting interdependently. Accordingly, design of the heat radiating coating layer is improved, and the heat radiating coating layer may advantageously have a broader application.

MODE FOR CARRYING OUT THE INVENTION

The transparent heat radiating coating composition of the present invention at least includes a binder resin, a hydrotalcite-series compound and a specified resin dispersant. The "heat radiating property" of a heat radiating coating layer in the present invention means the performance of lowering the temperature of a coated article by "heat radiation". The "heat radiation" performance used herein shall include the meaning of the "far infrared radiation" performance. The heat radiating mechanism of the "heat radiation" is to lower the temperature of a coated article by a mechanism different from "thermal conduction". The mechanism of lowering temperature by thermal conduction is a mechanism of effectively lowering temperature by using a material with high thermal conductivity as an article to be coated. This mechanism generally depends on the thermal conductivity of the article to be coated. On the other hand, the heat radiating mechanism by heat radiation is a mechanism of lowering temperature where a coating layer formed on an article to be coated absorbs heat from the article to be coated, followed by the heat radiation of the coating layer. When the coating layer absorbs heat from the article to be coated and the temperature of the coating layer rises, molecules and atoms constituting the coating layer turn into an excited state. However, the excited state is an unstable state, so that the molecules and atoms tend to return to a stable state by releasing energy in the form of infrared radiation. Energy is released at this moment and the temperatures of the coating layer and article to be coated are reduced. Casings and others where heat radiating coating layers are primarily provided are generally used in states surrounded by air. In other words, situations where heat radiating performance is expected in the heat radiating coating layer are cases of the heat radiating coating layer being placed in an air layer. Thus, even if the casing is made of a material with excellent thermal conduction, for example, it would be difficult to allow heat finally to escape through an air layer having very low thermal conductivity. Accordingly, heat radiation such as radiation from the surface is considered to be dominant in this case. In particular, in the case where the casing and others are made of materials with high thermal conductivity such as a metal, the most important matter is that the heat radiating properties such as radiation from the surface is excellent.

Binder Resin

A binder resin used in the transparent heat radiating coating composition of the present invention may be of various resins depending on a property of an article to be coated with the coating composition, coating methods and performance required in a coating layer. As the binder resin, among resins used in the fields of molding materials, coating materials, adhesives, printing inks and others, those having refractive indices close to that of a hydrotalcite-series compound may be used.

Specific examples of resins that may be used as the binder resin in the present invention include acrylic resins, polyolefin resins (for example, a polyethylene resin, a polypropylene resin, a polybutylene resin, and a copolymer thereof), polystyrene resins, AS resins, ABS resins, polyethylene terephthalate resins, vinyl chloride resins, vinylidene chloride resins, polyacetal resins, cellulose acetate resins, polycarbonate resins, polyamide resins, polybutylene terephthalate resins, urethane resins, epoxy resins, siloxane resins, imide resins and arylate resins. These resins may be used alone, or may be used in combination of two or more thereof. As the binder resin, an acrylic resin, a polyolefin resin and a cellulose acetate resin are more preferable used in light of transparency and coating properties. The "acrylic resin" used herein includes a methacrylic resin, a (meth)acrylic copolymer and others.

In the present invention, a thermosetting resin, an active energy ray (ultraviolet ray, infrared ray, visible light ray, radioactive ray or others)-curable resin, a room temperature-curable resin and others may be used as the binder resin. In each of the resins stated above, resins modified to have curable properties may be used as the binder resin in the present invention. Specific examples of such curable resins include a polyisocyanate curable resin, an amino curable resin, an alkyd resin, an acid (including anhydride)/epoxy curable resin, a base (amine compound, amide compound, polythiol compound or others)/epoxy curable resin, a polyester/melamine curable resin, a hydrolyzable functional group (alkoxysilyl group or others)-containing resin, a cation or anion polymerized curable resin, an oxidatively polymerized curable resin, an active energy ray-curable acrylic resin, an isocyanate curable acrylic resin and an acrylic urethane resin. A photopolymerization initiator generally combined may be incorporated into an active energy ray-curable resin.

In the present invention, the difference between the refractive index of the binder resin and that of the hydrotalcite-series compound is preferably within a range of 0 to 0.2, and more preferably within a range of 0 to 0.1. It is because the transparency of a coating layer to be obtained is improved when the refractive index difference falls within the range stated above. Among the hydrotalcite-series compounds, the hydrotalcite-series compound represented by the formula $Mg_{4.3}Al_2(OH)_{12.6}CO_3 \cdot 3.5H_2O$, for example, has a refractive index of 1.49 to 1.5. In this case, a binder resin having a refractive index of 1.29 to 1.7 is preferably used, and a binder resin having a refractive index of 1.39 to 1.6 is more preferably used.

The "transparent" in the "transparent heat radiating coating composition" used herein means that a coating layer obtained by coating the transparent heat radiating coating composition may be visually recognized as being transparent. For example, when a coating layer to be obtained has a haze value of 0 to 30, the coating layer my have little light scattering and may be visually recognized as being transparent. Also, for example, when a coating layer to be obtained has a total light transmittance of 80 to 100%, the coating layer may have high optical transparency and may be visually recognized as being transparent. The haze value and the total light transmittance may be measured, for example, with a haze meter in accordance with JIS K 7136.

The "refractive index" used herein means a value measured with an Abbe refractometer in accordance with JIS K 0062.

In the transparent heat radiating coating composition of the present invention, the binder resin is more preferably one or more resins selected from the group consisting of an acrylic resin, a polyolefin resin and a cellulose acetate resin. It is because the difference between the refractive index of such a resin and that of the hydrotalcite-series compound is within a range of 0 to 0.2. In the present invention, the binder resin is even more preferably an acrylic resin. It is because the resin is known to have remarkably high light transmittance as compared with other resins, thus light hardly scatters in the resin and transparency can be readily maintained.

Examples of the acrylic resin include acrylic resins obtained by polymerizing or copolymerizing acrylic monomers such as methyl (meth)acrylate, ethyl acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, isooctyl (meth)acrylate, isomyristyl (meth)acrylate, isostearyl acrylate (manufactured by OSAKA ORGANIC CHEMICAL INDUSTRY, LTD., product name), cyclohexyl (meth)acrylate, lauryl (meth)acrylate, isobornyl (meth)acrylate, tricyclodecanyl (meth)acrylate, adamantyl (meth)acrylate, 3,5-dimethyl adamantyl (meth)acrylate, 3-tetracyclododecyl (meth)acrylate, tridecyl (meth)acrylate, stearyl (meth)acrylate, 4-methylcyclohexylmethyl (meth)acrylate, 4-ethylcyclohexylmethyl (meth)acrylate, 4-methoxycyclohexylmethyl (meth)acrylate, tert-butylcyclohexyl (meth)acrylate, cyclooctyl (meth)acrylate, cyclododecyl (meth)acrylate, and tetrahydrofurfuryl (meth)acrylate. Other monomers that may be copolymerized with the acrylic monomers stated above may be copolymerized. Examples of the other monomers that may be copolymerized with the acrylic monomers stated above may include maleic acid, phthalic acid, itaconic acid, vinyl acetate, and styrene. The "(meth)acrylate" used herein means "acrylate or methacrylate".

In the present invention, it is the most preferable to use an acrylic resin having an acid value of 1 to 20 mgKOH/g as the binder resin. It is because such an acrylic resin has high affinity with the hydrotalcite-series compound and the resin dispersant so that high transparency may be achieved and at the same time, the hydrotalcite-series compound may successfully be retained, and thus there is an advantage that a coating layer to be obtained has good coating properties. Moreover, the acrylic resin preferably has a hydroxyl value of 0 to 100 mgKOH/g from the viewpoints of adhesive properties to the article to be coated and others.

The acrylic resin more preferably has a weight average molecular weight in a range of 1,000 to 1,000,000 in light of coating operability and others. The weight average molecular weight stated above is measured by gel permission chromatography and means a weight average molecular weight in terms of polystyrene.

A commercially available binder resin may also be used. For example, product name ACRYDIC A Series manufactured by DIC Corporation may be used.

Hydrotalcite-Series Compound

A hydrotalcite-series compound used in the present invention is a compound having a structure represented by the following general formula, $[M^{2+}_{1-x}M^{3+}_x(OH)_2]^{x+}[A^{n-}_{x/n} \cdot mH_2O]^{x-}$, wherein $M^{2+}$ is a divalent metal, $M^{3+}$ is a trivalent metal, $A^{n-}$ is an anion with a valence of n, x falls within a range of 0<x<0.33, and m is in 0 to 15. In the general formula stated above, examples of the divalent metal $M^{2+}$ include $Mg^{2+}$, $Zn^{2+}$, and $Ni^{2+}$. The divalent metal $M^{2+}$ may be a mixture of two or more of the metals stated above. Examples of the trivalent metal $M^{3+}$ include $Al^{3+}$, $Fe^{3+}$, and $Cr^{3+}$. Examples of the anion with a valence of n, $A^{n-}$, include $I^-$, $Cl^-$, $NO^{3-}$, $HCO_3^-$, $CO_3^{2-}$, a salicylic acid ion, an oxalic acid ion, and a citric acid ion.

As the hydrotalcite-series compound, a Mg—Al—$CO_3$-based hydrotalcite-series compound, where $M^{2+}$ is $Mg^{2+}$, $M^{3+}$ is $Al^{3+}$ and $A^{n-}$ is $CO_3^{2-}$, is advantageous in availability and heat radiating properties, and is more preferably used. Specific examples of the Mg—Al—$CO_3$-based hydrotalcite-series compound to be typically used include a hydrotalcite produced as a natural mineral and represented by $Mg_6Al_2(OH)_{16}CO_3 \cdot 4H_2O$ and a hydrotalcite-series compound represented by $[Mg_{4.5}Al_2(OH)_{13}]^{2+}[CO_3 \cdot 3.5H_2O]^{2-}$, or $Mg_{4.3}Al_2(OH)_{12.6}CO_3 \cdot 3.5H_2O$. These Mg—Al—$CO_3$-based hydrotalcite-series compounds each have a refractive index of 1.49 to 1.51, which is close to the refractive index of a common binder resin used in the field of coating, and production of clear coating films is possible.

The hydrotalcite-series compound may be a natural product or it may be a synthetic composition. As methods for synthesizing a hydrotalcite-series compound, the hydrotalcite-series compound may be synthesized by publicly known methods described in, for example, JP 46-2280B, JP 47-32198B, JP 50-30039B, JP 48-29477B, JP 51-29129B and others. A commercially available hydrotalcite-series compound may also be used. Examples of the commercially available product include "DHT-4A", "DHT-6" and others manufactured by Kyowa Chemical Industry Co., Ltd., and hydrotalcite-series compounds represented by structural formulae $[Mg_{4.5}Al_2(OH)_{13}]^{2+}[CO_3 \cdot 3.5H_2O]^{2-}$, $Mg_{4.3}Al_2(OH)_{12.6}CO_3 \cdot 3.5H_2O$ and $Mg_3Al(OH)_8(CO_3^{2-})_{0.5} \cdot 2H_2O$.

The hydrotalcite-series compound preferably has an average particle diameter of 0.05 to 30 μm, and more preferably 0.1 to 3 μm. The average particle diameter may be measured by methods generally used in measuring fine particles, for example, by a method using scattering type particle size measuring instrument based on laser diffraction (Micro Track).

The transparent heat radiating coating composition of the present invention contains 50 to 290 parts by weight of the hydrotalcite-series compound based on 100 parts by weight of the binder resin. The amount of the hydrotalcite-series compound is preferably 50 to 230 parts by weight, more preferably 80 to 200 parts by weight, and even more preferably 120 to 200 parts by weight based on 100 parts by weight of the binder resin. As described above, the transparent heat radiating coating composition of the present invention has a feature of containing a remarkably large amount of the hydrotalcite-series compound. The transparent heat radiating coating composition of the present invention contains a remarkably large amount of the hydrotalcite-series compound, thus achieves high heat radiating properties, and at the same time, has an advantage of attaining excellent transparency, i.e., low haze value, and high total light transmittance even though the content of the hydrotalcite-series compound is remarkably large.

Resin Dispersant

The transparent heat radiating coating composition of the present invention contains a resin dispersant. Inclusion of a specified resin dispersant in the coating composition improves the dispersing stability of the hydrotalcite-series compound in the coating composition, and accordingly allows for forming a coating layer having high transparency.

Examples of common resin dispersants include surfactants including aliphatic acids such as stearic acid and lauric acid, and derivatives thereof (fatty acid monoamide, fatty acid metal salts and others). On the other hand, the transparent heat radiating coating composition of the present invention uses a resin dispersant with an amine value of 0 to 90 mgKOH/g as a dispersant, and use of such a specified resin dispersant allows for achieving excellent transparency. Examples of the resin dispersant with an amine value of 0 to 90 mgKOH/g include various polymers such as an acrylic copolymer, a modified acrylic block copolymer, a polyaminoamide, an alkylol aminoamide, a siloxane polymer, and an acrylic/siloxane copolymer and derivatives thereof (alkali metal salts, alkaline earth metal salts, alkylammonium salts, phosphate esters and others), and resin dispersants such as a salt of a long-chain polyaminoamide and an acid polymer, a polycarboxylic acid salt of a polyaminoamide, a salt of a long-chain polyaminoamide and a polar acid ester, a copolymer having an acidic group, a hydroxyl group-containing carboxylic acid ester, an alkylolaminoamide, a copolymer containing an acid group, an unsaturated polycarboxylic acid polyaminoamide, an alkylammonium salt of an acidic polymer, a phosphate ester of a copolymer having affinity to pigments, a block copolymer having affinity to pigments, an alkylammonium salt of a block copolymer containing an acid group, a modified acrylic block copolymer, an unsaturated polycarboxylic acid polymer or unsaturated polycarboxylic acid polymer and polysiloxane, an unsaturated polycarboxylic acid polymer, an alkylammonium salt of a macromolecular copolymer, a macromolecular copolymer having a group with affinity to pigments, and an unsaturated acidic polycarboxylic acid polyester and polysiloxane. The resin dispersants stated above may be used alone, or may be used in combination of two or more thereof.

Examples of resin dispersants to be preferably used include Anti-Terra (registered trade mark) Series (U/U 100, 204/205 and others), Disperbyk (registered trade mark) Series (101, 102, 103, 106, 108, 110/111, 112, 116, 130, 140, 142, 145, 161, 162/163, 164, 166, 167, 168, 170/171, 174, 182, 183/185, 184, 2000, 2001, 2020, 2025, 2050, 2070, 2096, 2150 and others), and BYK (registered trade mark) Series (P104, P105, 9076, 9077, 220S and others), manufactured by BYK Japan KK.

When the resin dispersant has an amine value exceeding 90 mgKOH/g, the dispersibility of the hydrotalcite-series compound is good, but there is a disadvantage that the haze value of a coating layer to be obtained raises and its transparency deteriorates.

The resin dispersant more preferably has an acid value of 0 to 150 mgKOH/g. Examples of a resin dispersant that may be particularly preferably used in the present invention include anionic-based, cationic-based, nonionic-based and polymer type resin dispersants having an acid value of 0 to 150 mgKOH/g and an amine value of 0 to 90 mgKOH/g. The resin dispersant stated above more preferably has a weight average molecular weight of 100 to 100,000, and even more preferably 300 to 100,000.

In the present invention, the resin dispersant is preferably contained in an amount of 0.1 to 50 parts by weight, and more preferably 0.1 to 30 parts by weight based on 100 parts by weight of the hydrotalcite-series compound. By using the resin dispersant in the range stated above, a coating composition capable of forming a coating layer further excellent in transparency can be prepared.

Other Ingredients

The transparent heat radiating coating composition of the present invention may contain a solvent according to necessity. Inclusion of the solvent in the coating composition provides an advantage of being capable of preparing a coating composition having viscosity adequate for the coating form and improving the dispersibility of the hydrotalcite-series compound. Examples of the solvent that may be used include ketones such as methyl ethyl ketone MEM and methyl isobutyl ketone (MIBK), aromatic hydrocarbons such as toluene and xylene, aliphatic hydrocarbons such as heptane, and alcohols such as propylene glycol monomethyl ether, propylene glycol monomethyl ether acetate, 3-methoxy-3-methyl-1-butanol, 2-(2-methoxyethoxy) ethanol, and 2-butanol. Among these solvents, aromatic hydrocarbons such as toluene and xylene, methyl ethyl ketone (MEK), methyl isobutyl ketone (MIBK), heptane and propylene glycol monomethyl ether are preferable. However, in the transparent heat radiating coating composition of the present invention, the solvent is not limited to those listed above, and a broad range of organic solvents may be used as long as the solvent is capable of dissolving or dispersing the binder resin stated above.

The transparent heat radiating coating composition of the present invention may contain various ingredients used in the field of coating material according to necessity. For example, the coating composition may contain various kinds of additives such as a UV absorbing agent, a UV stabilizing agent, a curing catalyst, an antioxidation agent, a plasticizing agent and others. The coating composition may further contain according to necessity, for example, a pigment such as an anti-rust pigment or an extender pigment within the range of not affecting the transparent appearance of a coating layer to be obtained.

Method for Producing Transparent Heat Radiating Coating Composition and Coating Method The transparent heat radiating coating composition of the present invention may be prepared by mixing the binder resin, the hydrotalcite-series compound, the resin dispersant, and the solvent and the additives according to necessity. As methods for mixing these ingredients, mixing methods publicly known to a person skilled in the art using, for example, a paint shaker, a planet mill, a homogenizer, a kneader or others may be used.

In the preparation of the transparent heat radiating coating composition of the present invention, after mixing the ingredients stated above, a high dispersion treatment is preferably conducted with a ball mill, beads mill, three roll mill or an ultrasonic dispersion treatment. The conduct of the high dispersion treatment in the preparation of the transparent heat radiating coating composition provides advantages of reducing the haze value of a coating layer formed by coating a coating composition to be obtained and achieving high transparency. In particular, when an ultrasonic dispersion treatment is conducted, the high dispersion treatment may be processed in a short time. Examples of an instrument to be used for the ultrasonic dispersion treatment include Dedital Sonifier manufactured by Branson.

The transparent heat radiating coating composition of the present invention may be coated on an article to be coated by publicly known methods, for example, methods using a spray gun, a roll coater, a bar coater, a curtain flow coater, a roller or a brush. In the case where a spray gun is used, the coating composition of the present invention may be diluted with a diluent to the viscosity which is an adequate level to be applied with the spray gun if necessary. Examples of the diluent that can be used include the solvents stated above, such as aromatic hydrocarbons, alcohols and aliphatic hydrocarbons.

Examples of the article to be coated include various kinds of substrates that needs heat radiation such as metal materials including steel sheets, various plated steel sheets, aluminum sheets and stainless steel sheets, inorganic materials including glass, concrete, tiles and slates, and plastic materials including polyamide-based synthetic fibers (nylon™ and others), PET, polyolefins (polyethylene, polypropylene and others), polyvinyl chloride, acrylic and ABS. These articles to be coated may be subjected in advance to a degrease treatment, a clean treatment, or a surface treatment according to necessity. The article to be coated may be in the form of parts, products or half-finished goods, and examples thereof include electronic equipments such as computers, mobile phones, TV sets and AV equipments, drive units, semiconductor units, power devices, electronic element components constituting them and their casings.

A coating layer is formed by coating the transparent heat radiating coating composition of the present invention on the article to be coated, and curing the binder resin contained in the coating composition by a method suitable for the kind of the binder resin. For example, in the case where the transparent heat radiating coating composition of the present invention is a composition containing a solvent, and where the binder resin is not a so-called curable resin, a coating layer is obtained by evaporating the solvent from the coating film. In the case where various kinds of curable resins are used as the binder resin, a curing procedure corresponding to the feature of the curable resin is applied to a coating film obtained by coating the coating composition, and then the coating film is cured to obtain a coating layer. For example, when the binder resin is an active energy ray curable resin, a coating film obtained by coating the coating composition is irradiated with an ultraviolet ray or an electron ray to cure the coating film. The irradiation time and irradiation intensity of the ultraviolet ray or the electron ray may vary depending on the kind of the active energy ray curable resin and the thickness of the coating film, but in the case of ultraviolet ray irradiation, the ultraviolet ray is preferably irradiated in the order of about 100 to 3,000 $mJ/cm^2$. In the case of electron ray irradiation, the electron ray is preferably irradiated in the order of about 1 to 50 mega rad.

The amount of the transparent heat radiating coating composition of the present invention to be coated may be adequately selected from a broad range depending on the use of the article to be coated, but generally, the coating layer after curing preferably has a film thickness of 1 to 200 μm, and particularly preferably about 2 to 100 μm.

The transparent heat radiating coating composition of the present invention, when coated, provides an advantage of forming a coating layer having excellent heat radiating properties and high transparency. Many of conventional heat radiating coating films are in black or in white. For example, a white colored heat radiating coating film has an advantage of being capable of realizing colorful toning as compared with a black colored one. However, the white colored heat radiating coating film is difficult to turn into a coating film that effectively exploits a transparent appearance such as metallic coating. Because of the nature of the heat radiating mechanism, a heat radiating coating film is capable of realizing the maximum heat radiating properties when a coating film is formed on the outermost surface of the article to be coated. When the coating film on the outermost surface of the article to be coated is an opaque coating film in black or in white, a coating method exploiting the substrate of the article to be coated or metallic coating cannot be performed, and this provides a disadvantage of considerably restricting the design of the coating film and that of the article to be coated. In contrast, the coating film obtained by the transparent heat radiating coating composition of the present invention has excellent heat radiating properties as well as high transparency, and thus provides an advantage of achieving high heat radiation and excellent design.

The coating layer formed by the transparent heat radiating coating composition of the present invention has high transparency, and thus has an advantage that it can be formed on the surface of a luminescent component. For example, in the case where translucency and heat radiating properties are necessary at the same time as in the surface (a transparent part) of a luminescent portion in an LED, a white colored or a black colored heat radiating coating film having a concealing effect cannot be used. In contrast, the coating layer formed by the transparent heat radiating coating composition of the present invention has high transparency, and thus a heat radiating coating layer may be formed on the surface (a transparent part) of a luminescent portion in an LED. This increases the surface area of the heat radiating coating layer, and provides an advantage of achieving higher heat radiation. The coating layer formed by the transparent heat radiating coating composition of the present invention further provides an advantage that it can be formed on the surface of a transparent electronic circuit where good or bad of a circuit wiring needs to be visually checked.

The coating layer formed by the transparent heat radiating coating composition of the present invention has a feature of having high heat radiating properties and realizing high transparency. Thus, the coating layer has an advantage of imparting good heat radiating properties to an LED lighting appliance without impairing the performance as a lighting appliance. An LED light emitting element is used in the LED lighting appliance. The LED light emitting element is a semiconductor element, and therefore, it is susceptible to heat. For example, when the temperature of the LED light emitting element reaches 80° C. or higher, the element may possibly deteriorate. Thus, it is very important to enhance the heat radiating efficiency in the LED lighting appliances.

LED lighting appliances generally apply a heat radiating body made up of a metal such as aluminum with high thermal conductivity. A metal member such as aluminum has high thermal conductivity, but has low heat radiation performance and so that a heat diffusion efficiency from the surface is poor, and thus the heat radiating rate in the surface has been required. As a means to improve the heat radiating performance of a metal such as aluminum, methods for forming heat radiating coating film in white or in black stated above have been conventionally employed.

Meanwhile, the surface of a metal such as aluminum has mirror gloss, and thus it may be used as a light reflection member. In the case where a black colored heat radiating coating film is formed on an aluminum member in this case, the light reflecting performance will be remarkably reduced and the aluminum member will not be capable of being used as a light reflection member. In the case where a white colored heat radiating coating film is formed on a metal member, the light reflecting performance will also be reduced, although it is a lesser degree as compared with the case where a black colored heat radiating coating film is formed.

The coating layer formed by the transparent heat radiating coating composition of the present invention imparts high heat radiating properties and at the same time has high transparency, and thus has a feature of not impairing the metal gloss of the member. Accordingly, the transparent heat radiating coating composition has an advantage that it can be used very preferably in the aluminum member of the LED lighting appliance, which functions as a heat radiating and light reflection member.

The coating layer formed by the transparent heat radiating coating composition of the present invention has high transparency, and particularly has a feature of low haze value. The coating layer formed by the transparent heat radiating coating composition of the present invention has features of a large content of the hydrotalcite-series compound and high heat radiation. On the other hand, the coating layer has features of little light scattering within the coating layer and low haze value, even though the coating layer has a large content of the hydrotalcite-series compound. Accordingly, the coating layer formed by the transparent heat radiating coating composition of the present invention has features of high heat radiation, as well as high total light transmittance, little light scattering and low haze value.

EXAMPLES

The present invention will be further described in detail by the following examples, but the present invention is not limited thereto. In the examples, "parts" and "%" are in terms of weight basis, unless otherwise specified.

Examples 1 to 11

Preparation of Transparent Heat Radiating Coating Composition

An acrylic resin (Product name: ACRYDIC A-136-55, acid value 7, manufactured by DIC Corporation), a hydrotalcite-series compound (Product name: DHT-4A, average particle diameter 0.4 μm, manufactured by Kyowa Chemical Industry Co., Ltd.) in an amount indicated in the following table based on 100 parts by weight of the acrylic resin (solid), and a resin dispersant of the kind and amount indicated in the following table were added to a toluene solvent and then mixed. In Examples 1 to 10, high dispersion treatments were conducted with an ultrasonic instrument (Dedital Sonifier, manufactured by Branson). Thus, a transparent heat radiating coating composition in a suspended form was obtained.

Formation of Coating Layer

The transparent heat radiating coating compositions obtained in the examples state above were coated on various films (PET films when total light transmittance and haze values are measured, and aluminum films when heat radiating properties are evaluated) with a bar coater, followed by natural drying. Coating layers each having a film thickness of 10 μm were obtained in the case of measuring total light transmittances and haze values, and those each having a film thickness of 30 μm were obtained in the case of evaluating heat radiating properties.

Comparative Examples 1 to 7

According to the following table, coating compositions were prepared in the same manner as in the examples, except that changes were made in the following manner that the resin dispersant used was changed, the resin dispersant was not used, alumina was used instead of the hydrotalcite, and others. However, in Comparative Examples 1, 2, and 4 to 6, high dispersion treatments were conducted with an ultrasonic instrument (Dedital Sonifier, manufactured by Branson).

Using the coating compositions obtained, coating layers were formed in the same manner as in the examples stated above.

Using the coating layers produced in the examples and comparative examples stated above, performance evaluations were conducted as follows.

Total Light Transmittance and Haze Value

The total light transmittances and haze values of the coating layers in the examples and comparative examples, the layers being formed on PET films, were measured with a haze meter (HM-150, manufactured by MURAKAMI COLOR RESEARCH LABORATORY) in accordance with JIS K 7136. The results obtained are shown in the table below.

Measurement of Refractive Index

Refractive indices were measured with an Abbe refractometer in accordance with JIS K 0062. The refractive index of the acrylic resin alone was 1.49 (see Comparative Example 7).

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Material | Acrylic Resin | 100 parts | 100 parts | 100 parts | 100 parts | 100 parts | 100 parts | 100 parts | 100 parts | 100 parts | 100 parts | 100 parts |
| | Hydrotalcite | 120 parts | 140 parts | 160 parts | 180 parts | 160 parts | 160 parts | 160 parts | 160 parts | 160 parts | 160 parts | 120 parts |
| | Alumina | — | — | — | — | — | — | — | — | — | — | — |
| Dispersant | Dispersant A | 9.6 parts | 11.2 parts | 12.8 parts | 14.4 parts | — | — | — | — | — | — | 9.6 parts |
| | Dispersant B | — | — | — | — | 12.8 parts | — | — | — | — | — | — |

TABLE 1-continued

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
|  | Dispersant C | — | — | — | — | — | 12.8 parts | — | — | — | — | — |
|  | Dispersant D | — | — | — | — | — | — | 12.8 parts | — | — | — | — |
|  | Dispersant E | — | — | — | — | — | — | — | 12.8 parts | — | — | — |
|  | Dispersant F | — | — | — | — | — | — | — | — | 12.8 parts | — | — |
|  | Dispersant G | — | — | — | — | — | — | — | — | — | 12.8 parts | — |
| High Dispersion Treatment |  | Yes | Yes | Yes | Yes | Yes | Yes | Yes | Yes | Yes | Yes | No |
| Optical Property Evaluation | Total Light Transmittance | 89.4 | 88.3 | 89.1 | 89.3 | 89.0 | 89.0 | 89.2 | 89.0 | 89.1 | 89.1 | 88.6 |
|  | Haze | 5.7 | 8.7 | 14.0 | 26.9 | 20.6 | 14.0 | 9.2 | 11.3 | 15.8 | 17.0 | 29.5 |

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Material | Acrylic Resin | 100 parts | 100 parts | 100 parts | 100 parts | 100 parts | 100 parts | 100 parts |
|  | Hydrotalcite | — | — | 45 parts | 45 parts | 160 parts | 160 parts | 0 parts |
|  | Alumina | 120 parts | 200 parts | — | — | — | — | — |
| Dispersant | Dispersant A | 9.6 parts | 16.0 parts | 3.6 parts | 3.6 parts | — | — | — |
|  | Dispersant H | — | — | — | — | 3.2 parts | — | — |
|  | Dispersant I | — | — | — | — | — | 6.4 parts | — |
| High Dispersion Treatment |  | Yes | Yes | No | Yes | Yes | Yes | — |
| Optical Property Evaluation | Total Light Transmittance | 79.7 | 79.2 | 88.5 | 89.3 | 88.4 | 88.0 | 89.3 |
|  | Haze | 23.0 | 21.9 | 4.9 | 3.5 | 58.0 | 33.9 | 1.0 |

In the tables stated above,

Dispersant A: BYK-9076 (alkyl ammonium salt of macromolecular copolymer, acid value 38 mgKOH/g, amine value 44 mgKOH/g), Dispersant B: Disperbyk-140 (alkyl ammonium salt of acidic polymer, acid value 73 mgKOH/g, amine value 76 mgKOH/g), Dispersant C: Disperbyk-142 (phosphate ester of copolymer having affinity to pigments, acid value 46 mgKOH/g, amine value 43 mgKOH/g), Dispersant D: Disperbyk-110 (copolymer containing acid group, acid value 53 mgKOH/g, amine value 0 mgKOH/g), Dispersant E: Disperbyk-111 (copolymer containing acid group, acid value 129 mgKOH/g, amine value 0 mgKOH/g), Dispersant F: Disperbyk-2000 (modified acrylic block copolymer, acid value 0 mgKOH/g, amine value 4 mgKOH/g), Dispersant G: Disperbyk-102 (copolymer having acidic group, acid value 101 mgKOH/g, amine value 0 mgKOH/g), Dispersant H: Disperbyk-109 (alkylolaminoamide, acid value 0 mgKOH/g, amine value 140 mgKOH/g), and Dispersant I: Disperbyk-180 (alkylammonium salt of block copolymer, acid value 94 mgKOH/g, amine value 94 mgKOH/g) (all available from BYK Japan KK).

As is shown in the tables above, the total light transmittances calculated from the total amounts of light passed through the films having the coating layers of the examples were all high, and there was no significant difference as compared with the film of the coating layer including the binder resin (see Comparative Example 7). On the other hand, in each of Comparative Examples 1 and 2 where alumina was used instead of the hydrotalcite, the total light transmittance decreased by 10% and transparency was significantly impaired.

The haze value calculated from the amount of light decreased relative to the amount of light passed through the film having the coating layer represents the amount of scattering of parallel light within a sample, and shows the degree of haze. In the case where a coating composition containing hydrotalcite in particularly large amounts is used, it has been confirmed by experiments that the haze value rises to 30 or higher. On the other hand, it was confirmed that the haze value falls to 10 or lower and light scattering can be suppressed to an extent causing no problem as a resin dispersant with an amine value of 0 to 90 mgKOH/g is added and a high dispersion treatment is conducted according to necessity.

When a resin dispersant with an amine value of 0 to 90 mgKOH/g (Dispersants A to G) is used, samples having the coating layer obtained had a haze value of 30 or lower, which was sufficiently small (see Examples 3 to 10 and others). However, in Comparative Examples 5 and 6 using Dispersants H and I each with an amine value exceeding 0 to 90 mgKOH/g, the haze value considerably increased and the degree of haze was extremely high. That is, it was confirmed that use of a resin dispersant with an amine value exceeding 0 to 90 mgKOH/g significantly impaired transparency, and that such a resin dispersant could not be used.

In Comparative Examples 1 and 2 where alumina was used instead of the hydrotalcite, the total light transmittance was low. This is considered to be caused by the extremely high refractive index of alumina of 1.76.

Accordingly, Examples 1 to 11 and Comparative Examples 3 and 4 achieved good transparencies, i.e., sufficiently high total light transmittances and small haze values.

Evaluation of Heat Radiation

Figure 1:
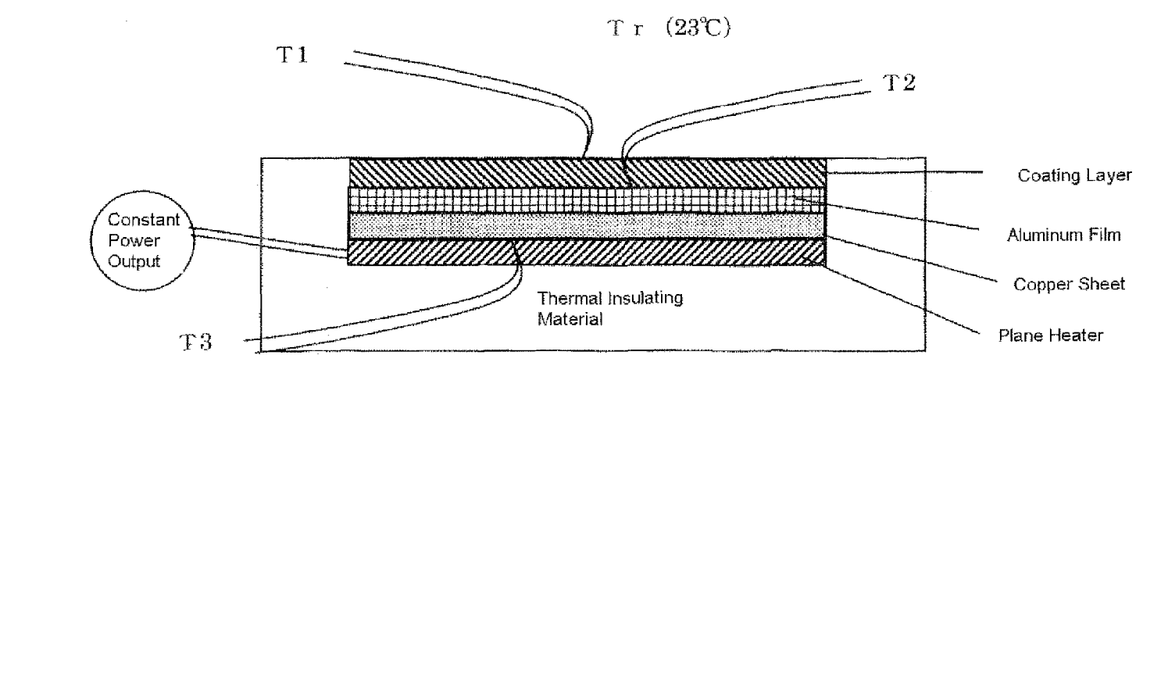
FIG. 1 is a schematic view showing an evaluation method of heat radiation in a coating layer.

The heat radiating performance of the transparent heat radiating coating composition was evaluated with a unit shown in FIG. 1. A plane heater installed in the unit left in a constant temperature room (Tr=23° C.) was connected to a constant voltage power source (PAC 25, manufactured by SHIMADEN CO., LTD.) and was heated at a constant power output (26.4 W), and the whole unit was heated by keeping the power output. In the unit, heat generated by the plane heater transfers to the copper sheet, then to the aluminum film and then to the coating layer by thermal conduction. The heat is then released from the surface of the coating layer by convection and radiation into the air in the constant temperature room. At this time, after a certain period of time, the amount of heat generated and the amount of heat radiated from the surface of the coating layer reach equilibrium, and the temperatures of the components become constant. At this moment, temperature at each of T1, T2 and T3 shown in FIG. 1 was measured with a thermocouple sensor (manufactured by KEYENCE CORPORATION). Here, the effects of the thermal conduction and the convection are not affected by the presence or absence of the coating layer or the kind of the coating layer. Thus, the effect of heat radiation is influenced by the difference in heat radiating performance (radiation effects) of the coating layer.

Measurement Conditions
Thickness of coating layer: 30 μm
Aluminum film: size 10 cm×10 cm, film thickness 100 μm
Heater resistance: 168.27'Ω

TABLE 3

|  | No Coating Layer | Comparative Example 7 | Comparative Example 2 | Comparative Example 4 | Example 2 | Example 4 |
| --- | --- | --- | --- | --- | --- | --- |
| T1 (° C.) | 142 | 128 | 127 | 126 | 122 | 121 |
| T2 (° C.) | 144 | 132 | 131 | 130 | 124 | 124 |
| T3 (° C.) | 149 | 136 | 134 | 134 | 130 | 129 |

As is shown in the table above, the acrylic resin itself has a sufficiently larger radiation rate than that of aluminum, thus it can be confirmed that, in Comparative Example 7 where the coating layer includes the acrylic resin, the surface temperature (T1) declined as compared with the case of only aluminum with no coating layer. In Comparative Example 4 which contains 45 parts by weight of hydrotalcite based on 100 parts by weight of the binder resin, the temperature further decreased by 2° C. as compared with Comparative Example 7, however the heat radiating performance was still insufficient.

On the other hand, in Examples 2 and 4 where the content of the hydrotalcite was large, the temperature further decreased by 5 to 6° C. as compared with Comparative Example 4, and the temperature decreased by 20 to 21° C. as compared with the case where an aluminum film was only used.

It can be confirmed that Examples 2 and 4 exhibit large temperature decreases as compared with Comparative Example 2 where a large amount of alumina was used, and that Examples 2 and 4 have excellent heat radiating performance.

Moreover in these examples, the temperature at the top of the heater which corresponds to the position of the heat source was decreased by 20° C. as compared with the case where an aluminum film was only used. Accordingly, the coating layers obtained from the transparent heat radiating coating compositions of the examples were confirmed to exhibit a considerable heat radiating effect.

Measurements of Gloss Value and Emissivity of Coated Material

Comparisons were conducted between the performance of the transparent heat radiating coating composition of the present invention and those of commercially available various heat radiating coating materials.

Coating compositions shown in the table below were coated on aluminum sheets to form coating layers.

The coating compositions of Nos. 1 and 2 (CT-200 white, black) were coated with a bar coater, and were preliminarily dried at 100° C. for 10 minutes. Then they were cured by heating at 180° C. for 20 minutes, and coating layers each with a thickness of about 25 μm were formed.

The coating composition of No. 3 (CT-100, delustered black) was coated with a bar coater, and was cured by heating at 180° C. for 20 minutes, and a coating layer with a thickness of about 25 μm was formed.

The coating composition of No. 4 (PSR-4000 LEW 1) was coated with a bar coater, and was preliminarily dried at 80° C. for 30 minutes. Then it was subjected to UV curing by irradiation of light of 300 mJ/cm$^2$ with a metal halide lamp, followed by curing by heating at 150° C. for 60 minutes. A coating layer with a thickness of about 25 μm was formed.

The coating composition of No. 5 (PELCOOL(registered trade name) H-7001) was coated with a bar coater, and was cured by heating at 160° C. for 25 minutes, and a coating layer with a thickness of about 25 μm was formed.

The coating composition of No. 6 (transparent heat radiating coating composition of Example 2) was coated with a bar coater, and was naturally dried, and thus a coating layer with a thickness of about 25 μm was formed.

Coated materials obtained in this manner were made as measurement samples. The gloss values and emissivities of these measurement samples were measured by the following method.

Gloss Value

A gloss value at an angle of 75° was measured with a digital multi-angle gloss meter, UGV-5D, manufactured by Suga Test Instruments Co., Ltd., in accordance with the provisions of JIS 28741.

Emissivity

A radiation rate was measured with an emissivity meter AERD manufactured by Kyoto Electronics Manufacturing Co., Ltd. The "emissivity" used herein means emissivity measured at the surface of an object to be measured, and is a value determined by the measurement in accordance with the provisions of ASTMC 1371-98. It means that the higher the emissivity is, the more excellent the heat radiating performance is.

TABLE 4

| No. | Various Coating Composition | Gloss Value (75°) | Emissivity |
| --- | --- | --- | --- |
| 1 | CT-200 white | 80.3 | 0.84 |
| 2 | CT-200 black | 77.7 | 0.88 |

TABLE 4-continued

| No. | Various Coating Composition | Gloss Value (75°) | Emissivity |
|---|---|---|---|
| 3 | CT-100 delustered black | 1.8 | 0.88 |
| 4 | PSR-4000 LEW 1 | 91.2 | 0.85 |
| 5 | PELCOOL (registered trade name) H-7001 | 87.0 | 0.82 |
| 6 | Transparent heat radiating coating composition of Example 2 | 241.5 | 0.90 |
| 7 | Uncoated aluminum sheet (Standard) | 296.5 | 0.01 |

CT-200 white: solvent type thermosetting coating material composition (white coating film formation), manufactured by Okitsumo Incorporated CT-200 black: solvent type thermosetting coating material composition (black coating film formation), manufactured by Okitsumo Incorporated CT-100 delustered black: solvent type thermosetting coating material composition (delustered black coating film formation), manufactured by Okitsumo Incorporated PSR-4000 LEW 1: development type solder resist composition (white coating film formation), manufactured by TAIYO INK MFG CO., LTD.

PELCOOL(registered trade name) H-7001: one component thermosetting resin composition (white coating film formation), manufactured by Pelnox Limited No. 7 is an uncoated aluminum sheet with no coating film or the like formed thereon. The aluminum sheet has a metal surface, and thus has a high gloss value and high light reflection performance. On the other hand, it can be confirmed that it has low emissivity, and that it is poor in heat radiating performance.

The coated materials obtained by coating a CT-200 coating material composition manufactured by Okitsumo Incorporated in Nos. 1 to 3 all had high emissivities as compared with the uncoated aluminum sheet (No. 7). On the other hand, the gloss values in Nos. 1 and 2 were decreased by 73 to 74% as compared with that of the uncoated aluminum sheet (No. 7), and were about 26 to 27% of No. 7. The gloss value in No. 3 was decreased by 99.4% as compared with that of No. 7, and was about 0.6% of No. 7.

The coated material obtained by coating PSR-4000 LEW 1 manufactured by TAIYO INK MFG CO., LTD. in No. 4 also had a high emissivity as compared with that of the uncoated aluminum sheet (No. 7). On the other hand, the gloss value in No. 4 was decreased by 70% as compared with that of the uncoated aluminum sheet (No. 7), and was about 30% of No. 7.

The coated material obtained by coating PELCOOL(registered trade name) H-7001 manufactured by Pelnox Limited in No. 5 also had a high emissivity as compared with that of the uncoated aluminum sheet (No. 7). On the other hand, the gloss value in No. 5 was decreased by 70% as compared with that of the uncoated aluminum sheet (No. 7), and was about 30% of No. 7.

The coated material obtained by coating the transparent heat radiating coating composition of Example 2 in No. 6 had the highest emissivity in the measurement samples of Nos. 1 to 7. Further, the coated material of No. 6 had a gloss value decrease of only 19% as compared with that of the uncoated aluminum sheet (No. 7), and retained the value of 200 or greater. It was confirmed that the coated material of No. 6 maintains a very high gloss value.

According to the results of the experiment stated above, it is found that the transparent heat radiating coating composition of the present invention retains the gloss of the metal surface, and at the same time, imparts excellent heat radiating performance. By applying the transparent heat radiating coating composition of the present invention to a light reflection member of an LED light emitting element, excellent light reflection performance may be retained, and at the same time, heat radiating performance may be significantly improved.

Industrial Applicability

The coating layer obtained by coating the transparent heat radiating coating composition of the present invention has a feature of having excellent heat radiating properties and high transparency. The coating layer obtained by the transparent heat radiating coating composition of the present invention has high transparency, and thus provides an advantage of enhancing design and allowing to be used in a wide range of applications.

The invention claimed is:

1. A transparent heat radiating coating composition consisting essentially of a binder resin, a hydrotalcite-series compound and a resin dispersant with an amine value of 0 to 90 mg KOH/g, wherein the transparent heat radiating coating composition includes 50 to 290 parts by weight of the hydrotalcite-series compound based on 100 parts by weight of the binder resin,
   the resin dispersant is an anionic-based, cationic-based, nonionic-based or a polymer resin dispersant,
   the binder resin is an acrylic resin, and
   the resin dispersant is contained in an amount of 0.1 to 30 parts by weight based on 100 parts by weight of the hydrotalcite series compound, wherein
   a difference between a refractive index of the binder resin and that of the hydrotalcite-series compound is 0 to 0.2, and
   a transparent heat radiating coating layer formed by coating the transparent heat radiating coating composition has a haze value of 0 to 30 and a total light transmittance of 80 to 100%.

2. The transparent heat radiating coating composition according to claim 1, wherein the resin dispersant has an acid value of 0 to 150 mg KOH/g.

3. The transparent heat radiating coating composition according to claim 1, wherein the binder resin is an acrylic resin having an acid value of 1 to 20 mg KOH/g.

4. The transparent heat radiating coating composition according to claim 1, which is a coating composition obtained by mixing a binder resin, a hydrotalcite-series compound and a resin dispersant with an amine value of 0 to 90 mg KOH/g, and then conducting a high dispersion treatment.

5. A heat radiating material having a transparent heat radiating coating layer formed by coating the transparent heat radiating coating composition according to claim 1 on a substrate.

6. A method for producing a transparent heat radiating coating composition comprising a mixing step of mixing a hydrotalcite-series compound, a resin dispersant with an amine value of 0 to 90 mg KOH/g and a binder resin so that the amount of the hydrotalcite-series compound is 50 to 290 parts by weight based on 100 parts by weight of the binder resin, and a dispersion treatment step of conducting a high dispersion treatment on the resulting mixture, wherein
   the resin dispersant is an anionic-based, cationic-based, nonionic-based or a polymer resin dispersant,
   the binder resin is an acrylic resin, and the resin dispersant is contained in an amount of 0.1 to 30 parts by weight based on 100 parts by weight of the hydrotalcite series compound.

* * * * *